United States Patent [19]
McCormick et al.

[11] 3,957,008
[45] May 18, 1976

[54] DRAG REDUCTION OF WATER VEHICLES USING GAS CREATED BY ELECTROLYSIS ON ELECTRODES ATTACHED TO THE HULL

[76] Inventors: Michael E. McCormick, 1906 Sands Drive, Pendennis Mount, Annapolis, Md. 21402; Rameswar Bhattacharyya, 1602 Ridout Road, Amberly, Annapolis, Md. 21401

[22] Filed: Mar. 28, 1974

[21] Appl. No.: 455,818

[52] U.S. Cl. .............................. 114/67 A; 204/147; 204/196
[51] Int. Cl.² ........................................... B63B 1/34
[58] Field of Search ............... 114/.5 R, 67 R, 67 A, 114/222; 115/11; 204/147, 196, DIG. 6

[56] References Cited
UNITED STATES PATENTS

| | | | |
|---|---|---|---|
| 820,105 | 5/1906 | Frazier | 114/222 |
| 843,357 | 2/1907 | Partee et al. | 114/222 |
| 994,405 | 6/1911 | James | 114/222 |
| 3,106,058 | 10/1963 | Rice | 115/11 |
| 3,412,005 | 11/1968 | Beer et al. | 204/196 |
| 3,625,852 | 12/1971 | Anderson | 114/222 |

*Primary Examiner*—Trygve M. Blix
*Assistant Examiner*—Jesus D. Sotelo
*Attorney, Agent, or Firm*—R. S. Sciascia; Q. E. Hodges

[57] ABSTRACT

Discrete bubbles of hydrogen and other gases are electrolytically created at line sources that are distributed transversely of a vehicle's centerline; the bubbles interact with the boundary layer next to the hull to reduce both skin friction and turbulent drag on the hull in the water.

6 Claims, 5 Drawing Figures

DRAG REDUCTION OF WATER VEHICLES USING GAS CREATED BY ELECTROLYSIS ON ELECTRODES ATTACHED TO THE HULL

The invention described herein may be manufactured and used by or for the Government of the United States of America for governmental purposes without the payment of any royalties thereon or therefor.

BACKGROUND

The incorporation of small bubbles of air or other gas into the boundary layer water next to a boat hull, in order to reduce hull drag, is not new; small and medium size boats have been designed with this feature for several years. These boats are designed to capture air at the bow and to force it to mix with and be entrained by the water next to the hull; this air-water mixture then alters the boundary layer which envelopes the hull. Since the viscosity of the air-water mixture is lower than that of water alone, the friction drag on the hull is reduced.

This method of getting air into the boundary layer is adequate for small boats; for larger hulls it presents several problems. First, larger hulls are usually made of steel, which presents fabrication problems due to the somewhat more complex hull shapes required for air entrainment. Second, it is sometimes difficult to get air to remain entrained within the boundary layer for the entire length of a long hull, since the hull tends to cause the water beneath it to be forced out to the sides of the hull. The result of these two phenomena is that the boundary layer along the aft part of the hull has little or no air within it, and consequently there is no reduction in drag along this portion of the hull.

Injecting air through small holes in the hull would not be practical, since these small holes would be subject to clogging by mud and/or marine organisms. Furthermore, unless the holes were extremely small, the bubbles could increase instead of decrease the drag; this is so because the bubbles would then generate additional drag at their points of production due to their size, rather than being assimilated into the boundary layer.

SUMMARY OF THE INVENTION

Briefly, the present invention comprises a series of pairs of wires, each pair comprising an anode and a cathode, that are placed transversely of the centerline of the hull. An electric current is passed through the wires, and hydrogen and other gases are produced by electrolysis of the water. The gases mix with the water in the boundary layer along the entire wetted surface of the hull, since they are produced along the entire wetted surface of the hull; in this manner, the drag of the entire hull is reduced.

OBJECTS OF THE INVENTION

Accordingly, it is an object of the present invention to reduce the drag of a ship hull.

It is a further object of the present invention to provide water-gas boundary layer along the entire wetted surface of a ship hull.

It is a further object of the present invention to generate bubbles of gas along the entire wetted surface of a ship hull.

Other objects and advantages of the present invention will be obvious from the following specification and accompanying drawings.

DESCRIPTION OF THE PREFERRED EMBODIMENT

Figure 1:
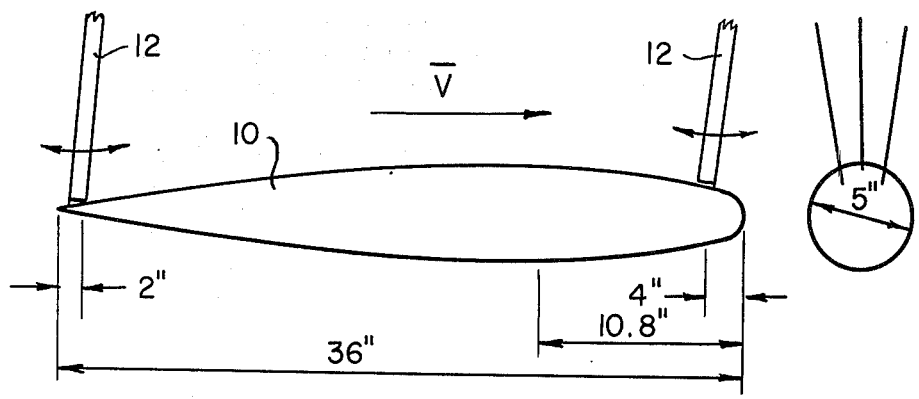
FIG. 1 is a schematic diagram of a submerged body of revolution used for testing the present invention.

FIG. 1 shows the body of revolution 10 which was used in the test conducted on a fully submerged model. The model was mounted to a force dynamomenter by three surface piercing struts 12. Two of the struts were mounted 4 inches aft of the bow, and the third was positioned 2 inches forward of the stern. These struts were 1 inch in width and 0.041 inch in thickness with tapered leading and trailing edges. The struts were pinned to the model and to the force block so that the model was free to swing fore and aft. The purpose of mounting the model in this fashion was to allow the hydrodynamically induced moment about the attachments at the force block to be compensated by the moment of the net weight of the model. The angle of the struts did not exceed 10 degrees at the maximum towing speed; thus, there was no significant change in the mean depth of the model.

The model was moved through the water by means of a conventional towing carriage which had a maximum speed of 16 feet per second.

Figure 2:
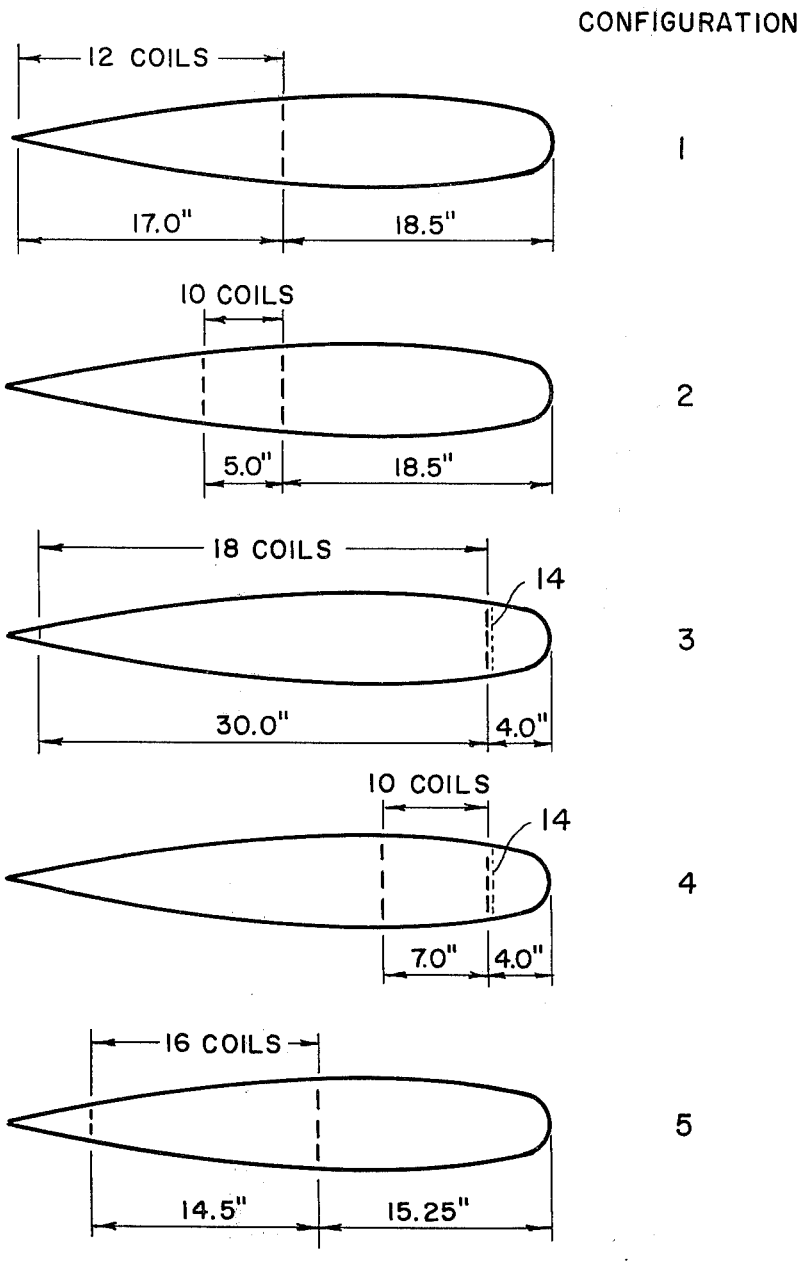
FIG. 2 shows the cathode configurations that were tested on the body of revolution of FIG. 1.

The cathode used was a copper wire having a diameter of 0.006 inch; it had an electrical resistance of approximately 5.7 ohms per foot. The anode lead was attached to the carriage frame, thus making the entire tank wall the anode. The copper cathode was wound around the hull in a helix; five configurations, shown in FIG. 2, were tested.

Configurations 1–4 were towed at a mean depth of 16.5 inches. For these configurations, the applied voltage in the electrolytic circuit was a constant 26.5 volts, drawing 0.53 amps. Boundary layer trips 14, circular cylinders of 0.0625 inch height and 0.125 inch diameter, were located 4 inches aft of the bow for configurations 3 and 4. Configuration 5 was towed at a mean depth of 14.5 inches. Three current values were used for this configuration — 0.25, 0.50, and 0.75 amps. This was for the purpose of determining the variation in drag reduction with a variation in hydrogen production for a constant cathode configuration. The current was limited by the fact that the tank was filled with fresh water, a poor electrolyte.

By knowing the electrical current value, the time rate of hydrogen mass production can be determined using Faraday's law of electrolysis. The time rates of hydrogen production for the five cathode configurations are presented in the following table along with the corresponding voltages and currents.

TABLE I

| Configuration | Voltage (volts) | Current (amperes) | $m_H$ (slugs/sec) |
|---|---|---|---|
| 1 through 4 | 26.5 | 0.53 | $3.80 \times 10^{-10}$ |

TABLE I-continued

| Configuration | Voltage (volts) | Current (amperes) | $m_H$ (slugs/sec) |
|---|---|---|---|
| 5a | 16.5 | 0.25 | $1.78 \times 10^{-10}$ |
| 5b | 32.5 | 0.50 | $3.56 \times 10^{-10}$ |
| 5c | 49.0 | 0.75 | $5.34 \times 10^{-10}$ |

Figure 3:
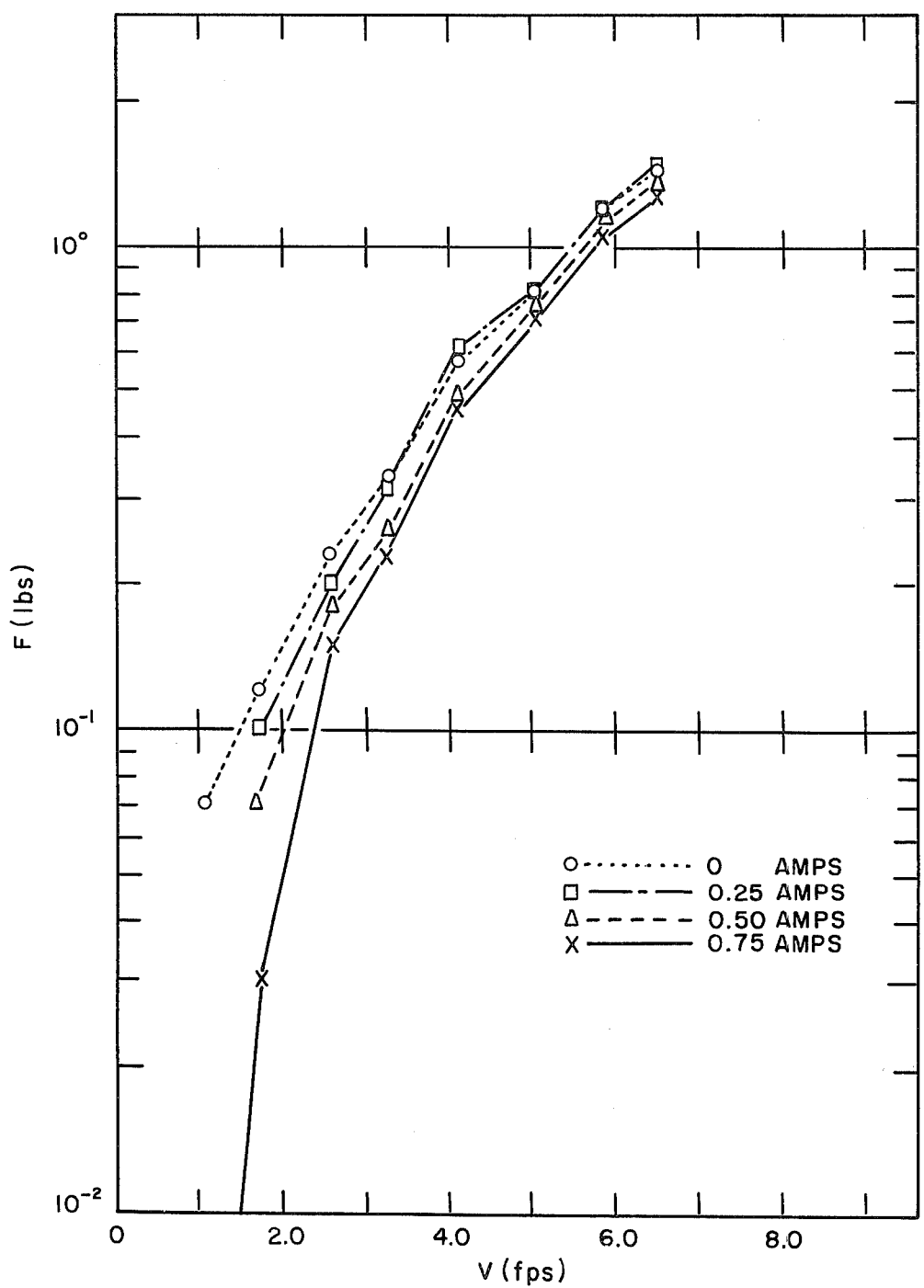
FIG. 3 shows the total resistance of the body of revolution of FIG. 1 with cathode configuration 5 on it at different cathode current values.

All of the cathode configurations 1–5 resulted in a decrease in measured drag of the model. Only the data resulting from configuration 5 will be discussed, however, since this is the configuration for which the most complete set of data was taken. As can be seen in FIG. 3, the amount of drag reduction depends on the towing speed and the current or time rate of hydrogen production. The amount of drag reduction is seen to be maximum at the lowest towing speeds, decreasing as the speed increases. Drag reduction is also a function of hydrogen production, increasing as the amount of hydrogen that is produced by the electrolysis process increases.

Both the position of the leading coil of wire and the extent of the wire over the model also affected the amount of drag reduction. For configurations 1 and 2, for which no boundary layer trips are present, the first coil was located at a position at which the wire would trip the boundary layer. Drag reduction was greater for configuration 1 over most of the speed range since the bubbles were distributed over 47% of the model. For the higher towing speeds, the wire coils near the stern caused a premature separation of the flow which resulted in larger drag coefficients. This did not occur on configuration 2 since the wire extended over only 14% of the hull. The reduction in drag at the lower speeds, however, was smaller for configuration 2 since less of the turbulent boundary layer was subjected to the bubbles.

The boundary layer trips used for configurations 3 and 4 were effective at Reynolds numbers greater than $11 \times 10^5$. For both of the configurations, the leading wire coil was positioned just downstream of the boundary layer trips; the wire extended over 83% of the hull for configuration 3 and over 19% for configuration 4. Drag reduction was appreciable for configuration 3 since the bubbles were produced under most of the turbulent boundary layer. On the other hand, the presence of the bubbles increased the drag at some of the lower speeds for configuration 4. The reason for this increase is that the bubbles in the region of transition can actually trip the flow, causing the boundary layer to become prematurely turbulent. The data showed that the flow at the lower speeds was somewhat "confused", alternating between laminar and turbulent flow.

Configuration 5 is the optimum for drag reduction on this particular model shape; the cathode coils begin near the point where the boundary layer becomes turbulent and extend over most of the portion of the model having a turbulent boundary layer. When the flow in the boundary layer is turbulent, the hydrogen bubbles first disrupt (and possibly destroy) the laminar sub-layer, thus eliminating this high shear region. As the bubbles are carried away from the surface into the "wall" and outer regions of the boundary layer, the bubbles tend to reduce the turbulent stresses by absorbing the momentum of the water by their elasticity. Further, the hydrogen bubbles prevent the transmission of small viscous shear stresses from the turbulent portion of the boundary layer to the model because of the low viscosity of the gas. From the data in FIG. 3, it can be seen that by increasing the current in the wire, the total drag at a given speed decreases. The zero drag reading at a speed of 1.09 ft. per second is attributed to the fact that hydrogen bubbles accumulated on the hull and the force dynamometer was not sensitive enough to detect the drag force. The increase in drag at the 4.1 feet per second speed and current of 0.25 amps is thought to be a result of experimental error.

The data from the above model test were extrapolated to a full size vehicle having a length of 30 feet, a maximum diameter of 8.33 feet, and the same shape as the model; the electrolytic wires were assumed to have the same configuration as in configuration 5 of the model, with the addition of anode wires as well to take advantage of the other gases that are generated during electrolysis. This full size vehicle was assumed to be operating in water having a salinity of 35 parts per thousand, which is representative of seawater throughout the oceans of the world. The results of this extrapolation are presented in Table II, wherein V is the speed of the vehicle in knots; $P_g$ is the power required to produce the gases; I is the current in the electrolytic circuit; $P_P + P_g$ is the total power required to propel the vehicle and to produce the gases; and S is the percentage of power saved by producing the gases.

TABLE II

| V (kts) | $P_G$ (hp) | I (amps) | $P_P + P_G$ (hp) | S(%) |
|---|---|---|---|---|
| EXAMPLE 1. | Depth, d = 15,000 feet; Temperature, T = 0°C; Conductivity, k = 0.029/ohm-cm | | | |
| 2.5 | 0.00 | 0.00 | 0.913 | 0.00 |
| 2.5 | 0.134 | 17.1 | 0.559 | 48.7 |
| 5.0 | 0.00 | 0.00 | 7.31 | 0.00 |
| 5.0 | 0.134 | 17.1 | 5.92 | 20.2 |
| 5.0 | 1.34 | 54.1 | 2.63 | 69.6 |
| EXAMPLE 2. | d = 1,000 feet; T = 15°C; k = 0.043/ohm-cm | | | |
| 2.5 | 0.00 | 0.00 | 0.913 | 0.00 |
| 2.5 | 0.134 | 20.8 | 0.402 | 61.6 |
| 5.0 | 0.00 | 0.00 | 7.31 | 0.00 |
| 5.0 | 0.134 | 20.8 | 5.30 | 28.9 |
| 5.0 | 1.34 | 65.9 | 2.22 | 74.3 |
| EXAMPLE 3. | d = 0.00 feet; T = 25°C; k = 0.053/ohm-cm | | | |
| 2.5 | 0.00 | 0.00 | 0.913 | 0.00 |
| 2.5 | 0.134 | 23.1 | 0.360 | 65.7 |
| 5.0 | 0.00 | 0.00 | 7.31 | 0.00 |
| 5.0 | 0.134 | 23.1 | 4.97 | 33.2 |
| 5.0 | 1.34 | 73.1 | 2.03 | 76.6 |

Figure 4:
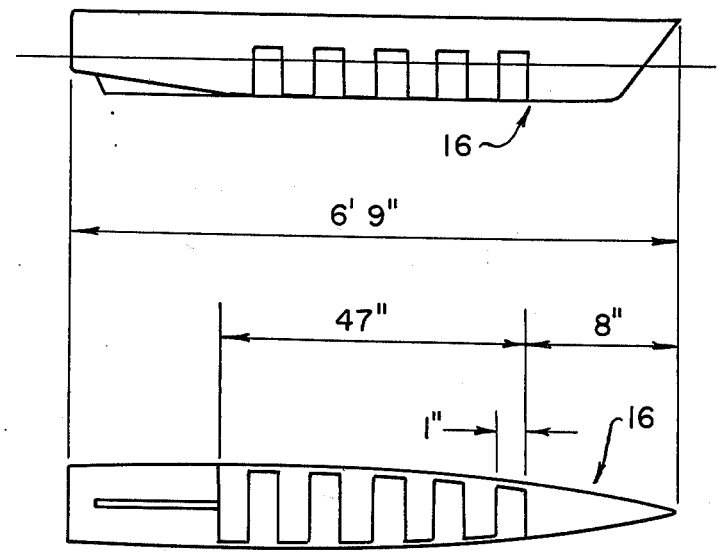
FIG. 4 shows the surface ship model that was tested.

FIG. 4 shows the surface ship model 16 that was tested. The model was mounted in the towing tank in the same manner as the fully submerged model. Several cathode configurations were tested; all of them resulted in drag reduction, but only the results for the one shown in FIG. 4 are presented since that is the one for which the most complete data were taken. The boundary layer for this configuration was turbulent (except at the lowest speeds) along the entire cathode, a result of the fact that the first cathode wire tripped the boundary layer. This was confirmed by installing boundary layer trips in front of the first wire and towing the model with no hydrogen production; since the drag was the same in both cases, the boundary layer is assumed to have been the same. In all cases the cathode was of 0.006 inch wire.

Figure 5:
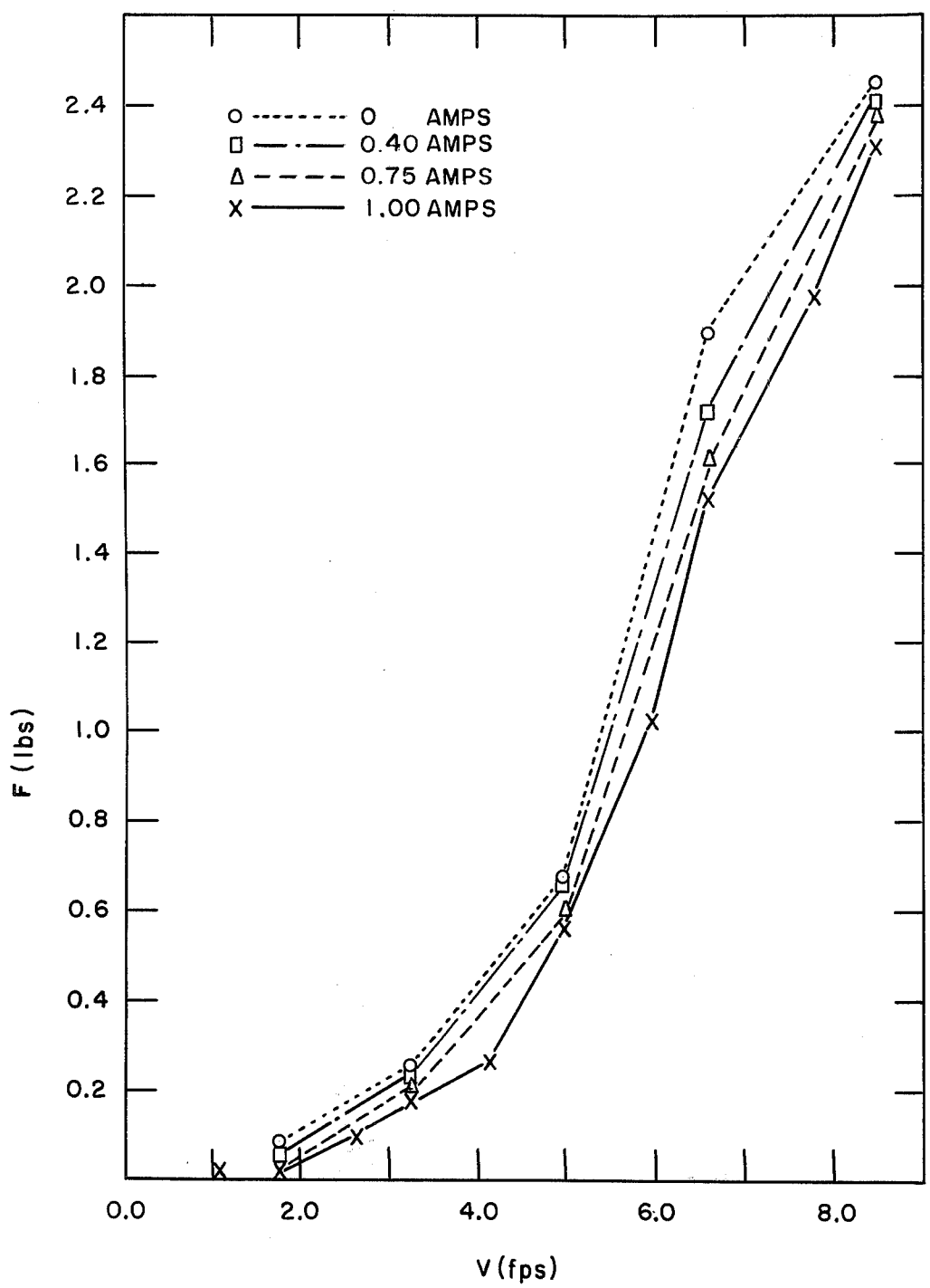
FIG. 5 shows the total drag of one cathode configuration of the surface ship model for varying amounts of hydrogen production at different speeds.

FIG. 5 shows the drag reduction achieved with the addition of various amounts of gas to the boundary layer. Again, it will be noted that drag is reduced more at the lower speeds and that drag reduction is proportional to the amount of gas in the boundary layer. As in the fully-submerged model test, the zero drag reading at the lower speeds and higher hydrogen production resulted from a lack of sensitivity of the force dynamometer used to measure drag.

The model tests were made on configurations that had cathode wires under those parts of the boundary layer that were known to be turbulent; in actual practice, however, the cathode wires would be placed on the entire wetted surface since the addition of gas to the laminar boundary layer would not cause an increase in drag. In the event that the bubbles cause the laminar boundary layer to become prematurely turbulent, as was noted in the fully submerged model test, the pairs of wires could be placed on different circuits and gases generated only at selected locations on the hull.

Also, in actual practice, a ship would have anode-cathode pairs of wires rather than just cathodes on its surface. This would allow the gas produced at the anode to enter into the drag-reducing mechanism rather than being wasted as in the towing tank. Since an electrolytic process such as this depletes the cathode, merely reversing the polarity in the pairs of wires would transfer the material back to the original cathode. In this manner, the problem of depletion of one of the electrodes would be obviated.

It has been found that the bubbles of gas must be small in order that they be able to function in the desired manner to reduce drag; electrodes which produce large bubbles act as a protuberance on the hull and tend to increase drag. Therefore, it is contemplated that in actual practice the anode and cathode members will be wires of approximately the same size as in the tests, 0.006 inch diameter.

Obviously, many modifications and variations of the present invention are possible in the light of the above teachings. It is therefore to be understood that within the scope of the appended claims, the invention may be practiced otherwise than as specifically described.

What is claimed is:

1. The method of reducing the drag of a marine vessel by introducing a gas into the boundary layer water along a marine vessel's hull which comprises:
   placing discrete electrically conductive members to extend along said hull transversely of the centerline of said hull and electrolyzing the water.

2. The method of claim 1 including arranging said electrically conductive members in pairs, each pair comprising an anode and a cathode.

3. The method of claim 1 wherein said electrically conductive members are approximately 0.006 inches wide.

4. A marine vessel comprising:
   A hull whose outer surface is designed to be at least partially in contact with water; and
   discrete electrically conductive members for producing a gas for reducing the drag of a marine vessel extending along said outer surface transversely of the centerline of said hull.

5. A marine vessel as in claim 4 wherein said discrete electrically conductive members are in pairs, each pair comprising an anode and a cathode.

6. A marine vessel as in claim 4 wherein said electrically conductive members are approximately 0.006 inches wide.

* * * * *